Oct. 5, 1965   A. DI SETTEMBRINI   3,209,400
APPARATUS FOR MANUFACTURING HOLLOW THERMOPLASTIC ARTICLES
Filed May 28, 1963   2 Sheets-Sheet 1
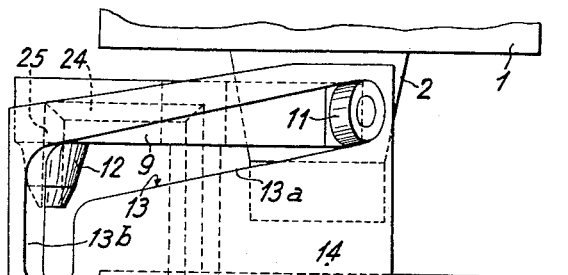
Fig.1.
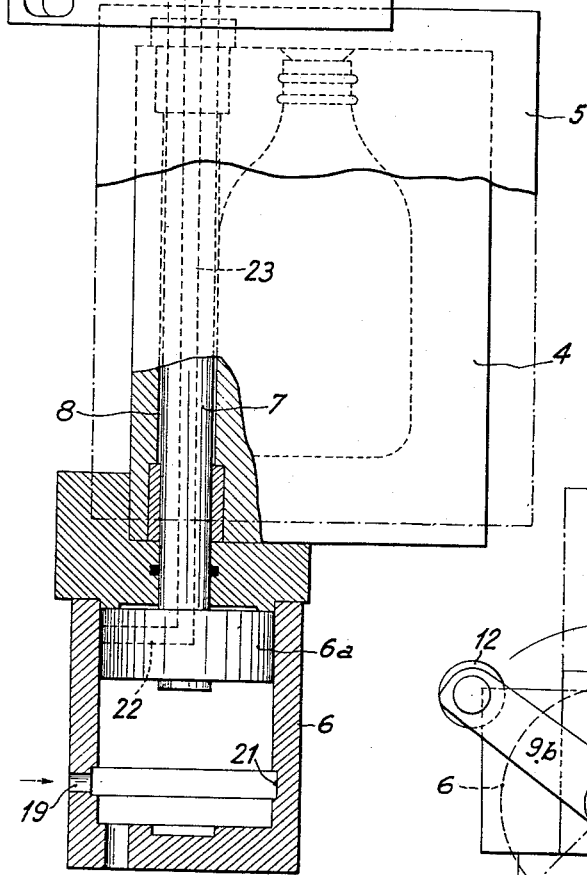
Fig.2.
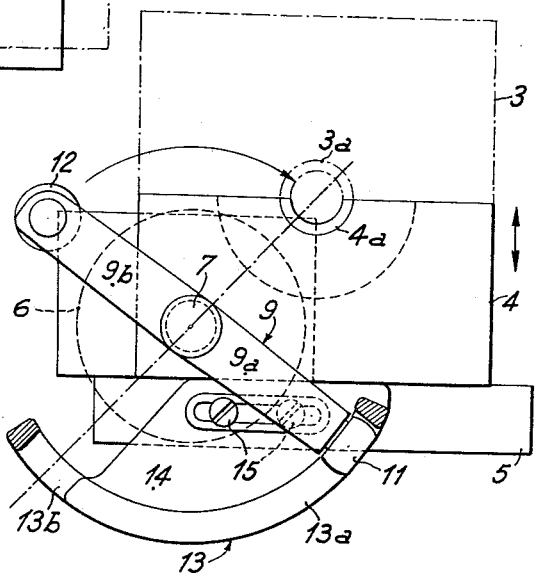

Oct. 5, 1965  A. DI SETTEMBRINI  3,209,400
APPARATUS FOR MANUFACTURING HOLLOW THERMOPLASTIC ARTICLES
Filed May 28, 1963  2 Sheets-Sheet 2
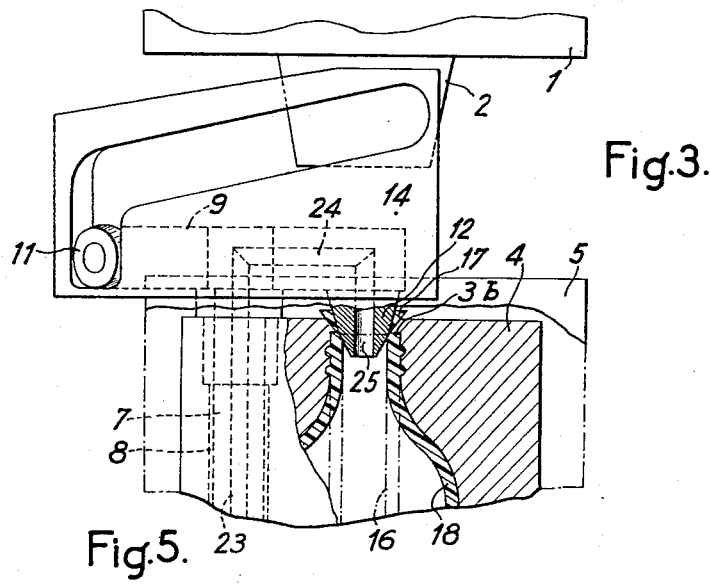
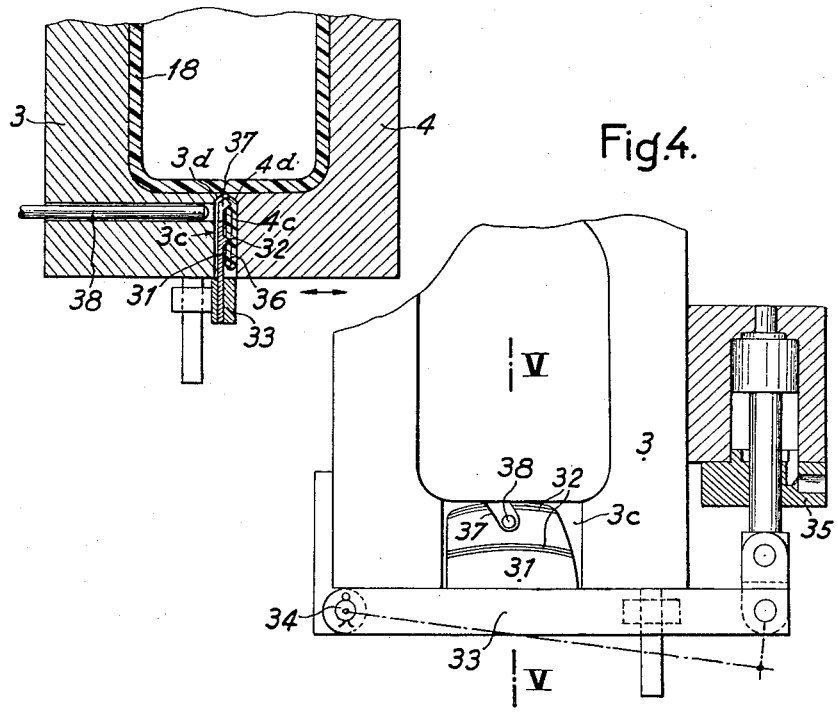

United States Patent Office
3,209,400
Patented Oct. 5, 1965

3,209,400
APPARATUS FOR MANUFACTURING HOLLOW THERMOPLASTIC ARTICLES
Antoine di Settembrini, 42 Residence du Petit Val, Sucy-en-Brie, France
Filed May 28, 1963, Ser. No. 283,926
Claims priority, application France, May 28, 1962, 898,946, Patent 1,333,806
3 Claims. (Cl. 18—5)

The present invention relates to improvements in or relating to apparatus for manufacturing hollow articles of thermoplastic material.

In hitherto known apparatus of this character, a blank in the plastic condition is placed into the impression of a mold and a fluid under pressure is blown into said blank whereby the latter will take the shape of the mold impression.

This invention is concerned with various devices designed for properly finishing articles of the type set forth hereinabove and improving the quality of the finished articles, notably in the manufacture of plastic bottles, flasks and the like.

To this end, the apparatus according to this invention for manufacturing hollow thermoplastic articles comprising a body ending with a neck of narrower cross-sectional size, wherein the hollow article is obtained by blowing a tubular blank in the plastic state which is disposed in the mold impression, is characterized in that it comprises a device for introducing into the blank portion which is to constitute the neck a punch adapted to shape said neck and to act at the same time as a blowing member or nozzle through which the fluid under pressure is introduced into the blank.

The blowing punch of this invention is effective in conjunction with the mold edges for shearing the runners or lugs consisting of excess thermoplastic material.

According to a modified embodiment of this invention, the blowing punch can be rotatably driven and in this case it is used for boring or remaining the inner wall of the bottle neck, whereby an article having a better appearance is obtained.

According to another feature characterizing this invention, the apparatus incorporates, at the place where the bottom of the hollow article is formed, a device adapted to cut off the plug consisting of the excess thermoplastic material trapped between the two assembled mold blocks.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawings, in which:

FIGURE 1 is a diagrammatic, part-elevational and part-sectional view of the device controlling the movement of the blowing punch shown in its inoperative position;

FIGURE 2 is a plan view of the assembly of FIG. 1;

FIGURE 3 is a diagrammatic, part-elevational and part-sectional view showing one fraction of the device controlling the movement of the blowing punch, the latter being shown in its operative position in the neck of a bottle;

FIGURE 4 is a diagrammatic, part-elevational, part-sectional view showing the lower mold block with the plug shearing device associated therewith; and FIGURE 5 is a section taken along the line V—V of FIG. 4, showing the two mold blocks in their assembled condition.

Referring first to FIGS. 1 and 2, the apparatus for manufacturing hollow thermoplastic articles comprises a stationary extruder 1 incorporating a die extension 2. Underlying the extrusion die 2 are the molds in which the tubular thermoplastic blanks are to be placed. Each mold consists of two blocks or halves, namely a fixed mold block 3 shown in chain-dotted lines in FIG. 2, and a movable mold block 4 rigid with a mold carrier plate 5.

Secured on the movable mold block 4 is a double-action fluid-actuated cylinder 6 of which the piston rod 7 extends through a passage 8 formed in this mold block 4.

Mounted on the upper end of rod 7 is a diametral lever 9 having two arms 9a, 9b carrying the former (9) a roller or like cam follower 11 and the other (9b) a blowing punch 12. The roller 11 engages a cam groove 13 formed in a cylindrical cam member 14 extending concentrically to the piston rod 7 of cylinder 6. This cylindrical cam member 14 is secured by means of screws 15 on the upper portion of the mold carrier plate 5. The cam groove 13 comprises a first helical section 13a followed by a second straight section 13b parallel to the piston rod 7.

The above-described apparatus operates as follows:

The tubular plastic blank is firstly positioned between the two mold blocks 3, 4 and the movable block 4 is moved toward the stationary mold block 3. During this movement the tubular blank is clamped between the neck portions 3a and 4a of mold blocks 3 and 4.

Then, a fluid pressure is applied on the upper face of the piston 6a in cylinder 6, and the piston rod 7 is this moved downwardly as seen in FIG. 1. The movement of roller 11 along the guide groove 13 produces simultaneously a movement of rotation of the two-armed lever 9 about the axis of rod 7 (as long as the roller 11 moves along the helical section 13a of cam groove 13), and then a downward movement of translation of punch 12. During the first combined movement the blowing punch 12 is brought to a position in which it overlies the orifice formed by the neck portions 3a and 4a of mold blocks 3 and 4, respectively. Then, as the roller 11 travels along the straight, vertical section 13b of the cam groove 13, the punch 12 penetrates into the upper portion of the thermoplastic blank 16 shown in chain-dotted lines in FIG. 3 in the blank position obtaining prior to the blowing operation. As the punch 12 descends into the blank 16, it squeezes the blank material against the sharp edges of the mold blocks, such as the sharp edge 3b of mold block 3. The excess thermoplastic material will thus form ears or lugs 17 which are finally cut and removed from the main body of the tubular blank contained in mold blocks 3 and 4.

According to a complementary feature of this invention, the punch 12 is also used as a blowing device for expanding the tubular blank 16 to its final shape. To this end, the cylinder 6 comprises a blow air injection or inlet port 19 leading into a groove 21 formed internally of the cylinder. Thus, when the piston 6a is at its bottom dead center position (FIG. 1), that is, when the punch is positioned as shown in FIG. 3, this groove registers with a lateral or radial duct 22 formed in the piston 6a. This duct 22 leads in turn into an axial duct 23 formed in the rod 7 which opens into a duct 24 formed in one arm of lever 9 and finally into an axial duct 25 formed in the punch 12 proper. Therefore, when this punch 12 has been lowered into the upper end of the tubular blank 16 as shown in FIG. 3, blowing air can be introduced through the port 19 and directed into the tubular blank 16 through the duct 25 of punch 12.

Although the form of embodiment described and shown by way of example comprises a punch 12 of substantially frusto-conical configuration, it would not constitute a departure from the basic principles of this invention to use punches having a different configuration. Thus, notably, a cylindrical punch may be used which corresponds in diameter to the desired size of the bore of the bottle neck being manufactured. To complete the neck-finishing operation, the punch 12 may, if desired, be rotatably mounted on the lever 9 so as to ream the inner wall of the neck after the punch has been introduced therein. In this case the punch 12 may be rotatably driven by means either of an electromotor carried by the lever 9, or by a turbine fed with compressed air or other fluid.

Now reference will be made to FIGS. 4 and 5 to describe the device contemplated for removing the plug developing at the lower portion of the mold. In these figures it will be seen that the stationary mold block 3 has formed in its lower portion a recess 3c ending at its top with a sharp edge 3d. Co-acting with this sharp edge 3d is another sharp edge 4d formed on the companion mold block 4, which also ends a recess 4c. Housed in recess 3c is a claw 31 formed with lateral ribs 32 and mounted on a lever 33 pivoted on a pivot pin 34 under the control of a fluid-actuated cylinder 35.

This plug cut-off device operates as follows: When the movable mold block 4 is pressed against the fixed mold block 3, the excess thermoplastic material forms a plug 36 which is compressed in the recess 4c of mold block 4. Thus, the ribs 32 of claw 31 project into the plug material. Then the cylinder 35 is fed with compressed fluid in order to rotate the lever 33 about its pivot pin 34 in the clockwise direction (FIG. 4). As a consequence of this movement, the claw 31 is moved downwards and carried along the plug 36, thus removing same from the bottom of bottle 18.

The claw 31 is formed with an oblique slot 37, which, during the downward movement of the claw 31, moves past the orifice of a duct in which an extractor 38 is slidably mounted. The purpose of the extractor 38 is to remove the plug 36 from the claw 31 after the movable mold block 4 has been moved away from the stationary mold block 3.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. An apparatus for manufacturing hollow thermoplastic articles, wherein the hollow article is formed by blowing a tubular blank in the pastic state which is disposed in the impression of a two-portion mold, comprising in said mold a recess in which the end of said tubular blank is pinched during the molding operation and forms a plug, a claw slidably engaged in said recess for gripping said plug and means for driving said claw into and out from said recess in the direction of the longitudinal axis of said tubular blank.

2. An apparatus as set forth in claim 1, comprising a lever pivotally mounted on said mold and having mounted said claw thereon, and a fluid-actuated cylinder for operating said lever.

3. An apparatus as set forth in claim 1, comprising an extractor member adapted to remove said plug from said claw and wherein said claw is formed with a slot through which said extractor member is adapted to project.

References Cited by the Examiner

UNITED STATES PATENTS

| 3,032,809 | 5/62 | Willard | 18—5 |
| 3,018,489 | 3/63 | Jackson | 18—5 |

FOREIGN PATENTS 221,038  3/58  Australia.

J. SPENCER OVERHOLSER, *Primary Examiner.*

MICHAEL V. BRINDISI, *Examiner.*